March 24, 1953 L. R. GRAY ET AL 2,632,493
POSITION-CONTROLLING MEANS FOR GRIPPING JAWS
Filed Sept. 2, 1950 7 Sheets-Sheet 1

Inventors
LANDON R. GRAY
HARRY P. SMITH, JR.
By C. F. Stratton
Attorney

March 24, 1953   L. R. GRAY ET AL   2,632,493
POSITION-CONTROLLING MEANS FOR GRIPPING JAWS
Filed Sept. 2, 1950   7 Sheets-Sheet 2

Inventors
LANDON R. GRAY
HARRY P. SMITH, JR.
By C. G. Stratton
Attorney

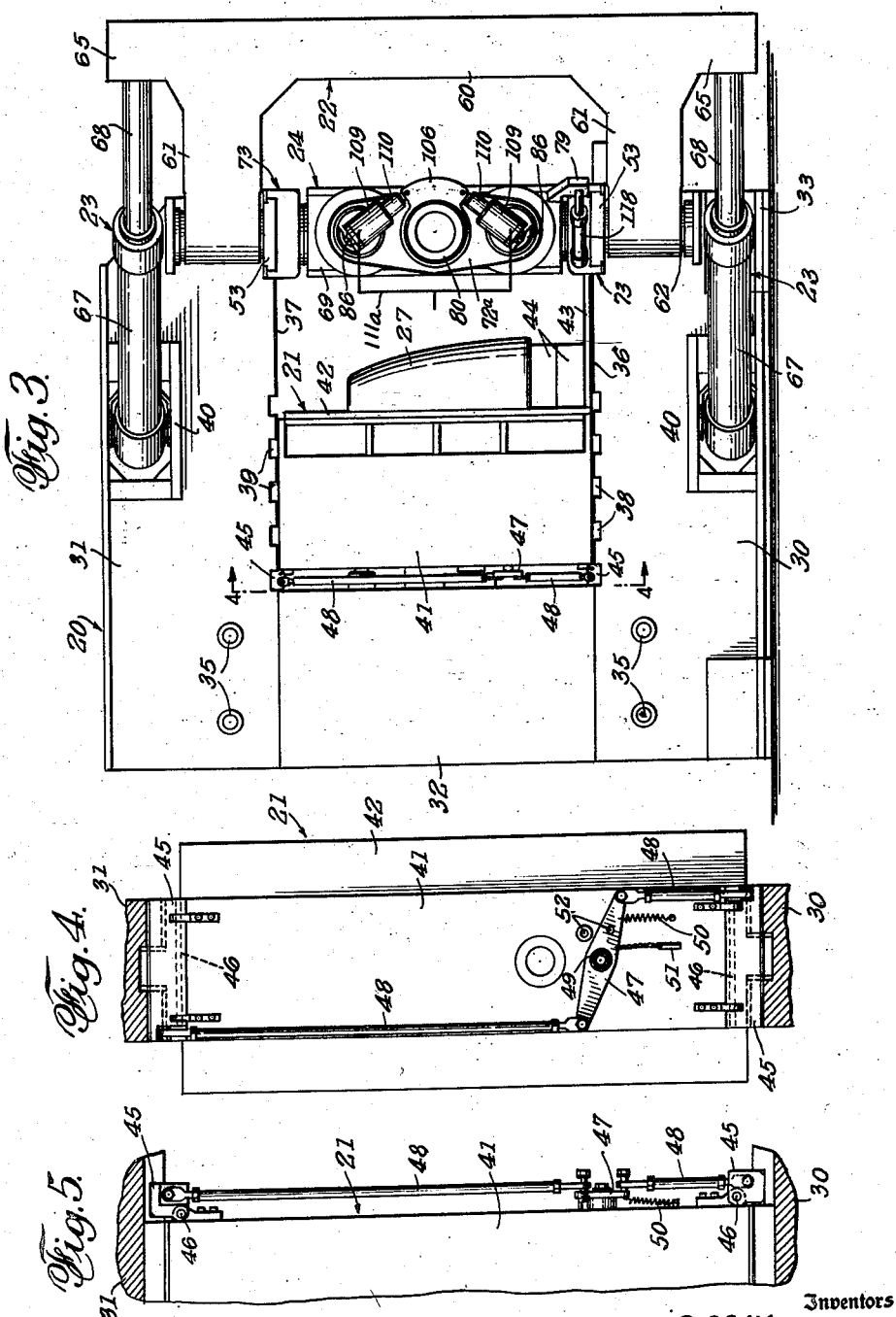

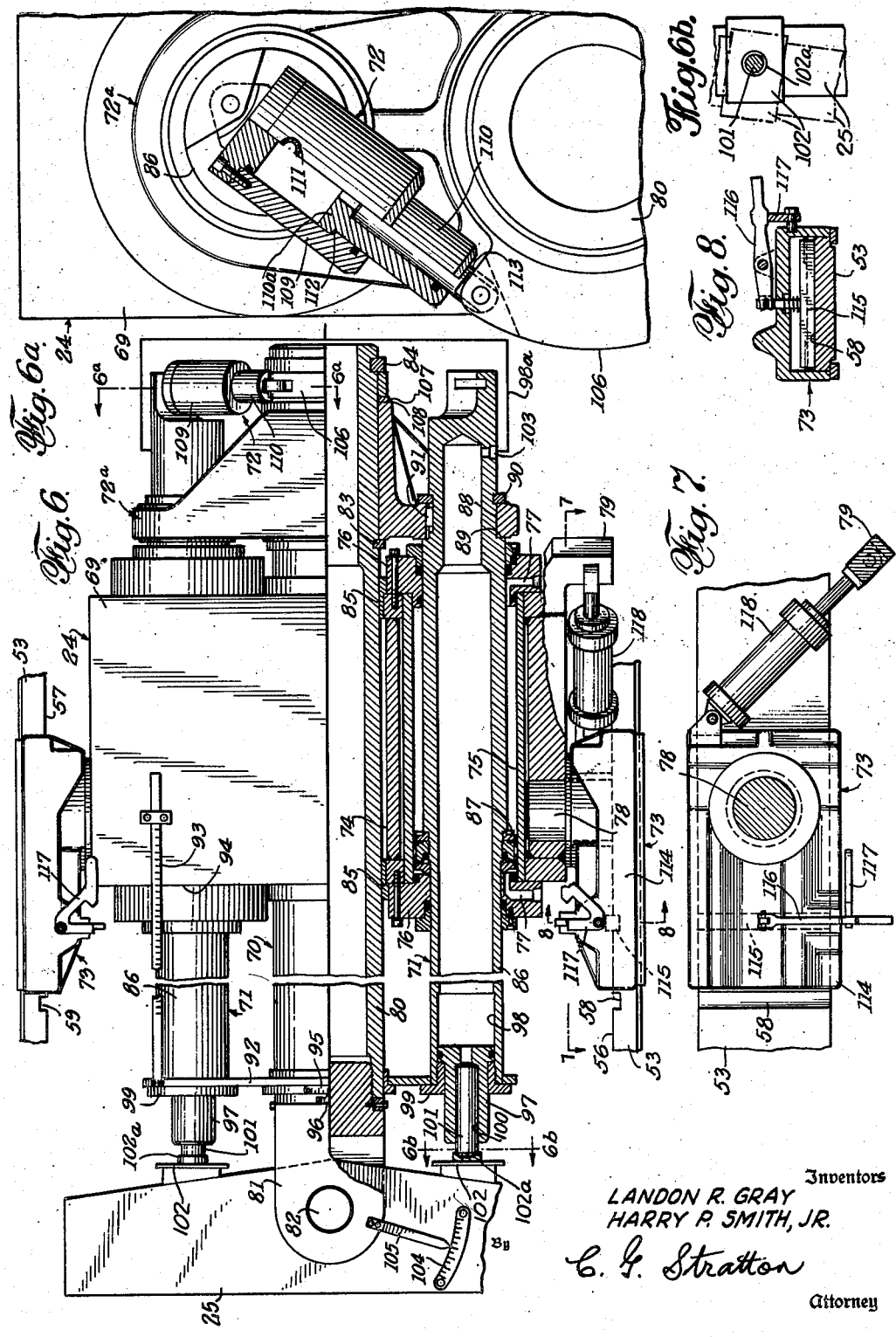

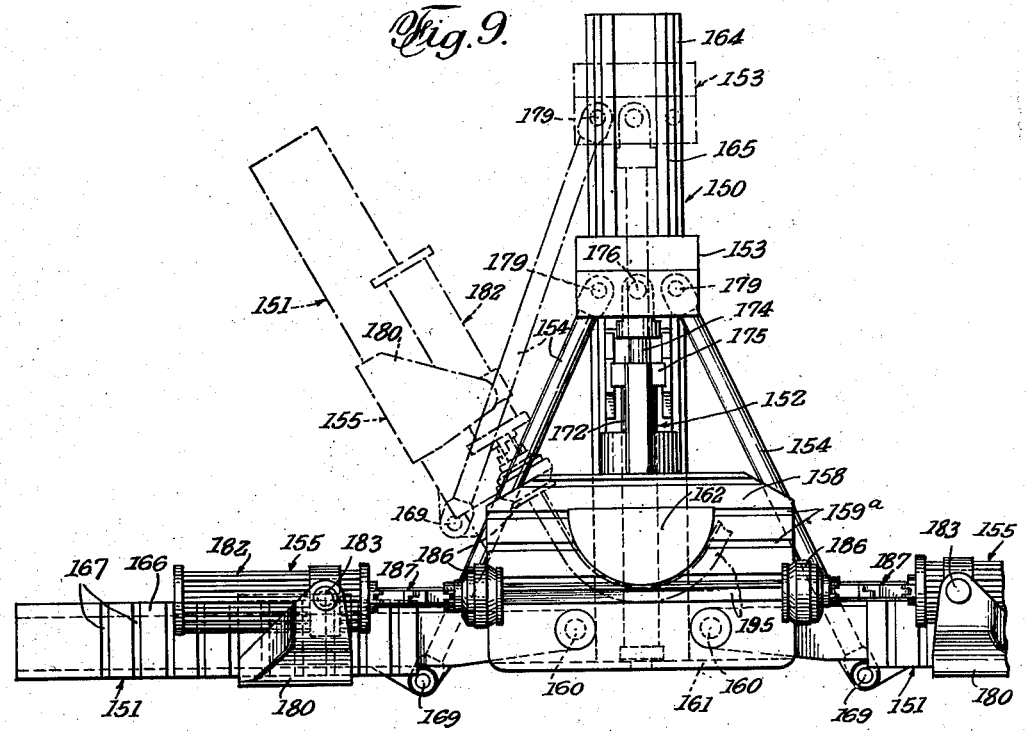
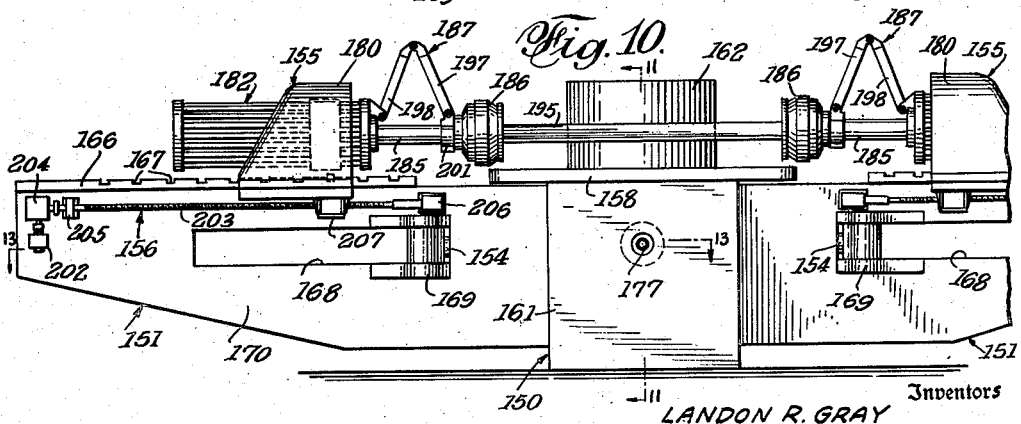

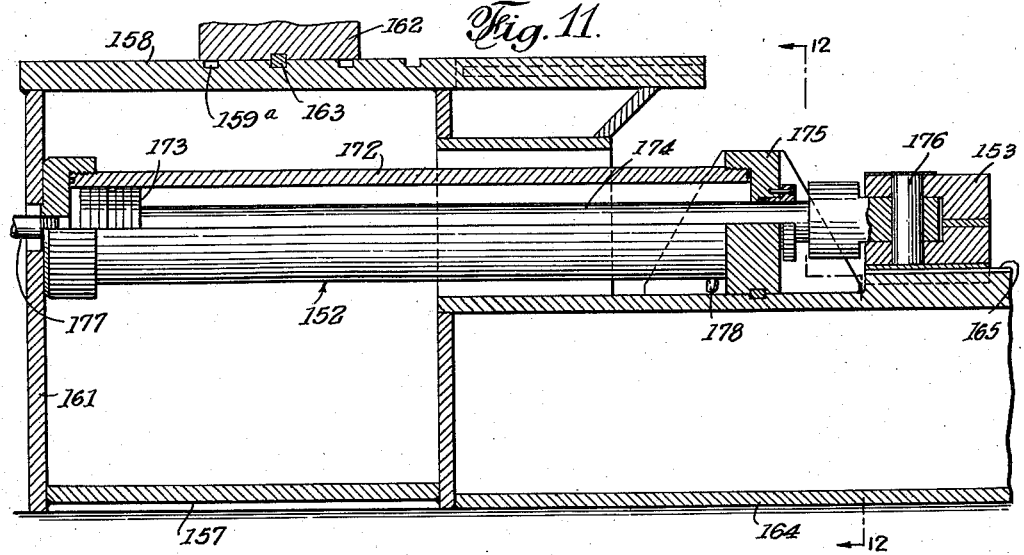
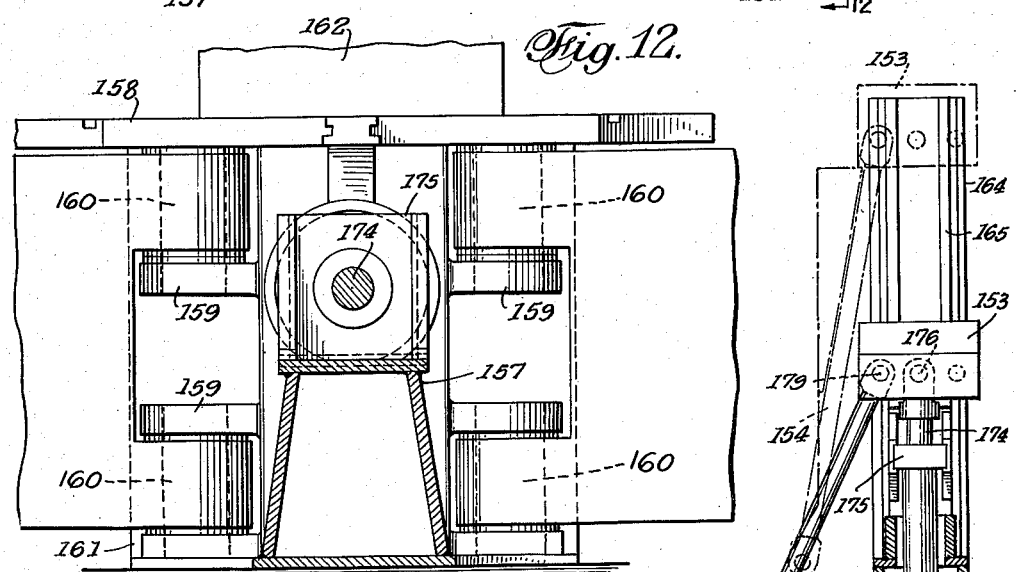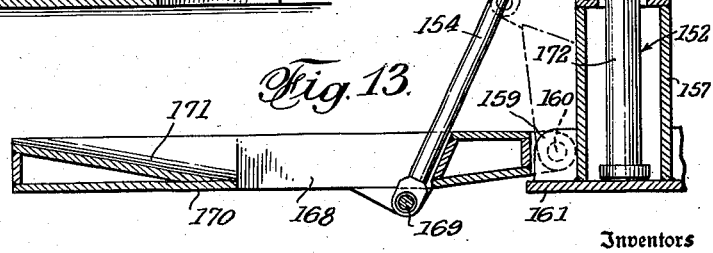

March 24, 1953  L. R. GRAY ET AL  2,632,493
POSITION-CONTROLLING MEANS FOR GRIPPING JAWS
Filed Sept. 2, 1950  7 Sheets-Sheet 7
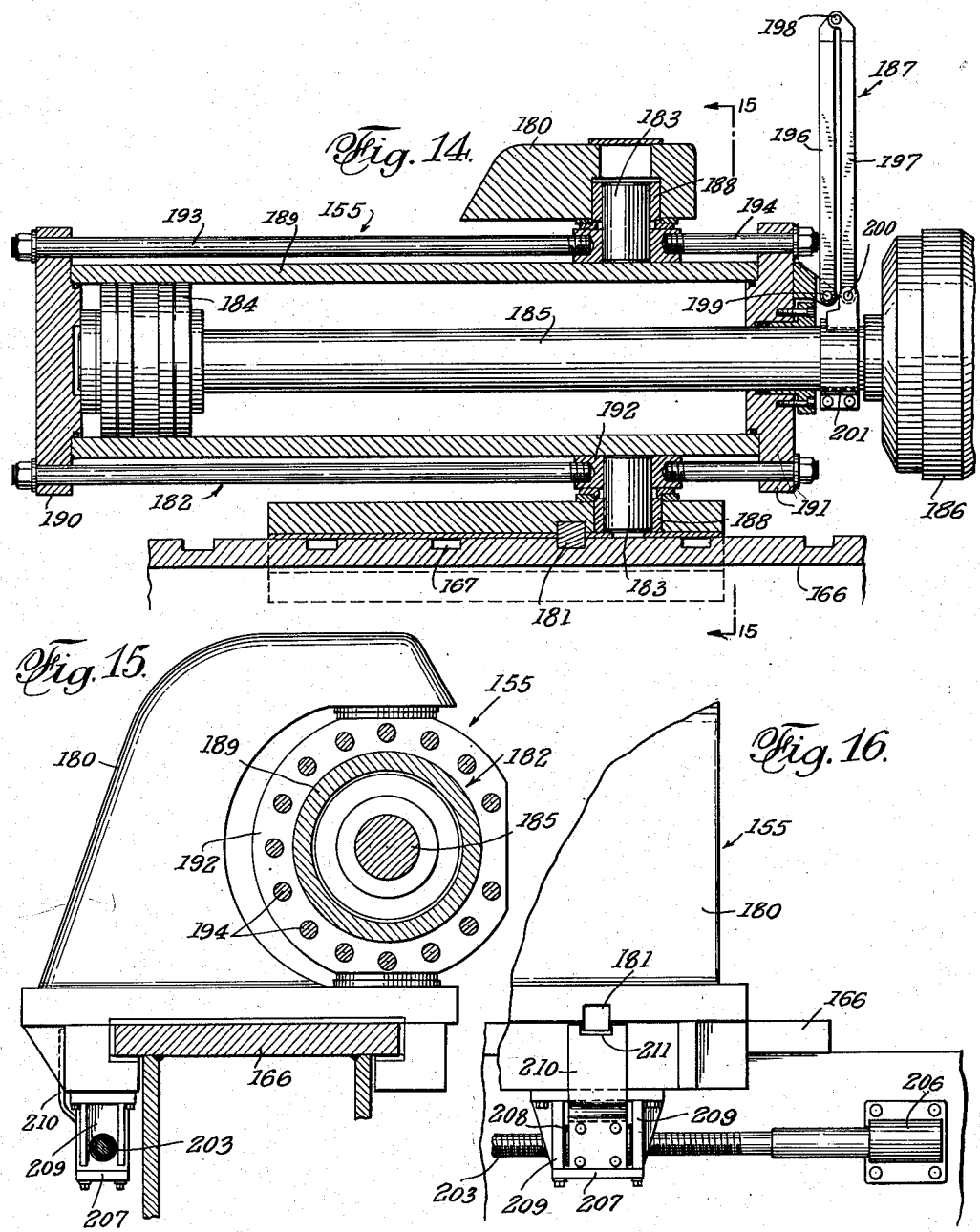
Inventors
LANDON R. GRAY
HARRY P. SMITH, JR.
By C. G. Stratton
Attorney Patented Mar. 24, 1953

2,632,493

UNITED STATES PATENT OFFICE 2,632,493

POSITION-CONTROLLING MEANS FOR GRIPPING JAWS

Landon R. Gray, Redondo Beach, and Harry P. Smith, Jr., Los Angeles, Calif., assignors to Richard Seifried, Venice, Calif.

Application September 2, 1950, Serial No. 182,928

8 Claims. (Cl. 153—32)

This invention relates to a machine for forming bends in elongated members and in sheets and for simultaneously stretching said members and sheets so that the same retain the bent form imparted by the machine. The present machine, disclosed in two preferred forms thereof, is an improvement of the Bending and Beveling Machine disclosed in Patent No. 2,357,027.

In said patent, cable systems, involving pulleys, a winch and a motor drive therefor, are employed to effect operative movement of the arms that bend a member over a die. One form of the present machine contemplates the improvement that replaces such means with simple fluid-operated cylinders enabling independent control of the movement of each arm. The other form also eliminates such cable systems and employs instead a single hydraulic cylinder that is connected to effect controlled and powerful movement of the arms. It is an object of the invention, therefore, to provide a machine of the instant character that is of simpler and more efficient construction.

One of the forms of the present disclosure is more particularly devised for stretch-forming wide sheets over dies of various forms wherein more stretch is imparted to a sheet at some points than at others. It is, therefore, another object of the present invention to provide an improved machine for handling such wide sheets, the same embodying novel tension cylinder means that is adapted to compensate for the varying stretch in the sheet and to control the operation and movement of the chucks that grip the ends of the sheet being stretch-formed.

Another object of the invention is to provide a machine of the type referred to that, while quite large and of considerable mass and weight, can be easily adjusted for a particular job of work and is of such sensitivity that relatively heavy members are handled with sureness and efficiency and without undue strain on the machine.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 3 is an end view as seen from the left end of Fig. 2.

Fig. 4 is a further enlarged vertical sectional view as taken on line 4—4 of Fig. 3.

Fig. 5 is a fragmentary sectional view as seen from the left of Fig. 4.

Fig. 6 is a partial elevational and partial longitudinal sectional view, to the scale of Figs. 4 and 5, of one of the two tension cylinders employed in the machine.

Figure 1:
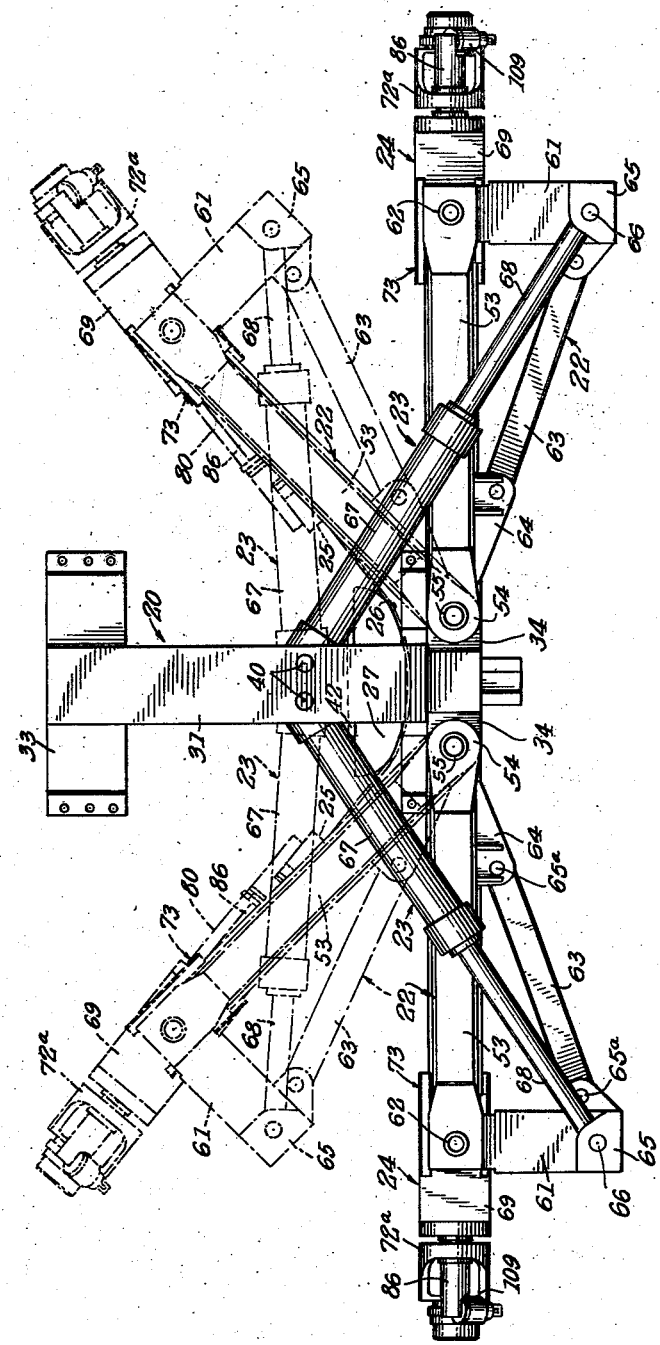
Fig. 1 is a plan view of a stretch-forming machine embodying the improvements of the present invention, the same constituting an embodiment particularly devised for handling sheets.

Fig. 6$^a$ is an enlarged fragmentary sectional view as taken on line 6$^a$—6$^a$ of Fig. 6.

Fig. 6$^b$ is a fragmentary sectional view taken on line 6$^b$—6$^b$ of Fig. 6.

Figs. 7 and 8 are sectional detail views taken on the respective lines 7—7 and 8—8 of Fig. 6.

Fig. 9 is a plan view, with one bending arm partly broken away, of the other embodiment of the invention, the same being more particularly adapted to handle elongated members rather than sheets.

Fig. 10 is a front elevational view thereof.

Fig. 11 is an enlarged and partial cross-sectional view as taken on line 11—11 of Fig. 10.

Fig. 12 is a cross-sectional view as taken on line 12—12 of Fig. 11.

Fig. 13 is a horizontal sectional view, to the scale of Figs. 9 and 10, the same being taken on line 13—13 of Fig. 10.

Fig. 14 is an enlarged longitudinal sectional view of one of the two tension cylinders employed in the present embodiment.

Fig. 15 is a cross-sectional view as taken on line 15—15 of Fig. 14.

Fig. 16 is a fragmentary front view showing means for adjusting the tension cylinders, the view being taken from the left of Fig. 15.

With particular reference to Figs. 1 to 8, inclusive, the stretch-forming machine comprises, generally, a rigid base frame 20, an adjustable die box assembly 21 carried by said frame, a pair of swingable arm assemblies 22 on either side of the base frame, a pair of hydraulic cylinder assemblies 23, connected between the base frame and the free end of each arm assembly to swing the latter between an aligned position at the front of the machine and a parallel position alongside of the base frame, and a tension cylinder assembly 24 carried by each arm assembly and each having a sheet-gripping jaw or clutch 25 cooperating to hold a sheet 26 for stretch-forming over a die 27 mounted on the die box 21.

Figure 2:
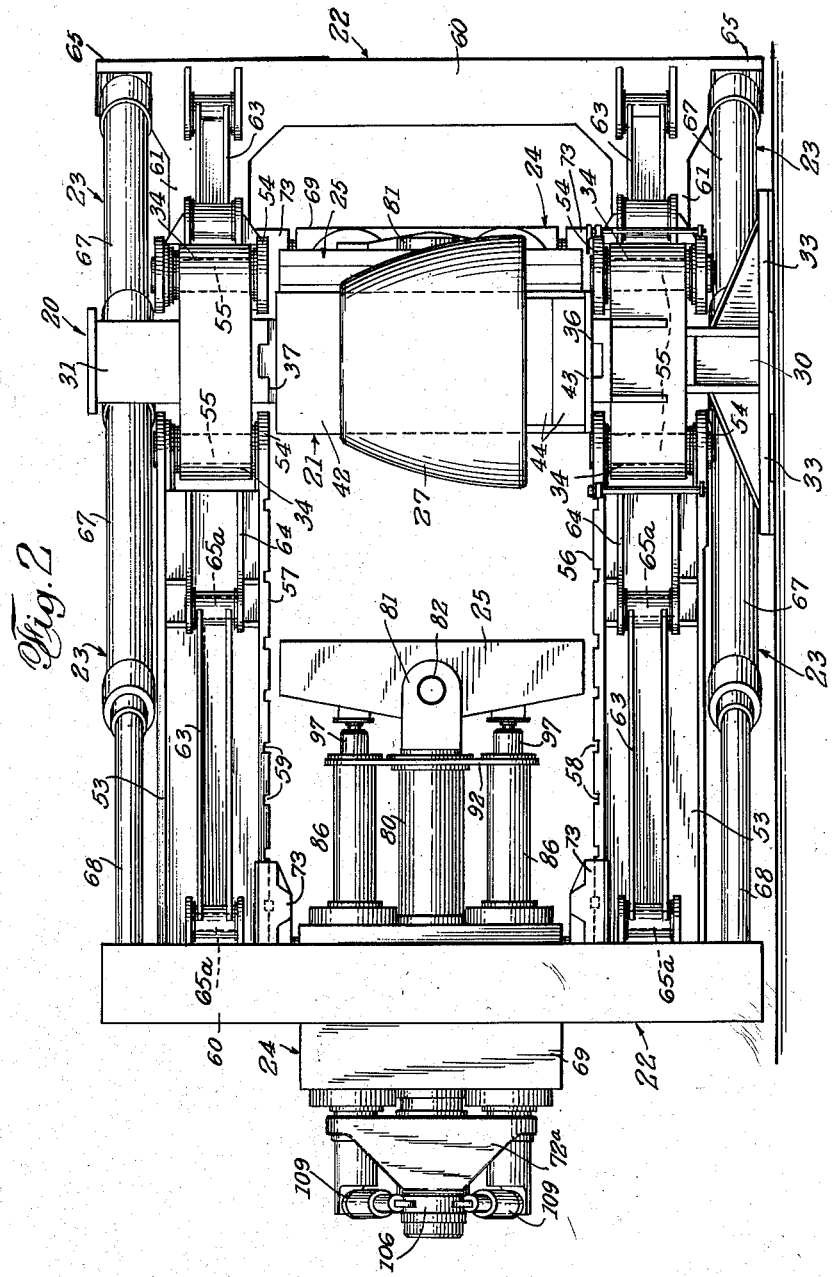
Fig. 2 is an enlarged front elevational view thereof with one of the sheet-bending arms swung rearwardly to another position.

The base frame 20 is more clearly seen in Fig. 3, the same being generally C-shaped, having base and cap portions 30 and 31, respectively, that are horizontally disposed, and a vertical column 32 connecting said portions. Laterally directed foot brackets 33, front and back, lend stability to the frame and afford means by which said frame can be bolted to a supporting surface. At the front end of each frame portion 30 and 31, there is provided a pair of bearings 34 as best seen in Fig. 2.

The base frame 20, because of its large size, is formed as a fabricated structure of welded metal plates and in a manner so that portions 30 and 31 may be connected to column 32 by bolts 35. The upper face 36 of portion 30 and the opposite under face 37 of portion 31 are provided with a series of transverse and aligned key slots 38 and 39, respectively, the latter being utilized to locate die block assembly 21 relative to the open front of the frame. The frame is also provided with bearings 40 for pivotal connection with one end of each of the hydraulic cylinder assemblies 23, said bearings being located rearward of bearings 34.

The die box assembly 21 slidingly fits between surfaces 36 and 37 and comprises a box 41 on the forward end of which is affixed a vertical wall 42 on which die 27 is removably mounted. A platform 43 extends forward from the die box and serves as a support for spacers 44 on which the die rests, the same varying in thickness, as desired, and obviating the die becoming displaced.

The rear face of box 41 mounts a pair of keys 45, top and bottom, for engagement in key slots 38 and 39, said keys being mounted on pivots 46 to be swingable into and out of engagement with the slots. Simultaneous movement of said keys on their pivots is effected through the medium of a walking-beam 47 and rods 48 connecting the opposite ends of said beam and the respective keys. Said beam tilts on a central pivot 49 and a spring 50 tilts the same in a direction to project keys 45 into slots 38 and 39. The keys may be retracted or withdrawn to free the die block so that the same may be moved to adjusted position by pulling down on the longer rod 48 or up on the shorter rod. To hold the keys retracted, a captive pin 51 is employed to lock the beam 47 to the rear face of the die box, said pin entering holes 52 where the latter are aligned.

Each of the two arm assemblies 22 is formed as a generally C-shaped frame, as seen from the side, and has the form of a right triangle, as seen in plan. Each arm assembly comprises upper and lower horizontally disposed arms 53 that are each provided with ears 54 that connect to pivot pins 55 extending through bearings 34, the bearings on one side of the base frame 20, thereby pivotally mounting the arm assembly on that side. In the present case, the upper face 56 of each lower arm 53 is arranged to be level with the face 36 of the base frame, and the under face 57 of each upper arm 53, level with face 37 of said base frame. Key slots 58 and 59, respectively, are provided in faces 56 and 57 in a manner similar to the slots 38 and 39 in faces 36 and 37.

The free ends of each pair of arms 53 are connected by a vertical member 60 that is forwardly offset from said arms, said members 60 being each provided with lateral portions 61 that connect to said free ends as by means of pins 62. Thus, arms 53 comprise one leg of the triangular form of each arm assembly and portions 61 comprise the other leg. The hypotenuse of said triangular form comprises a pair of braces 63 that extend from a side of member 60 to a bracket 64 on each arm 53. It will be seen that the rigid triangular form of arm assemblies 22 is achieved by connecting the ends of braces 63, as above, by means of pins 65ª. The member 60 of each arm assembly is provided with upper and lower extensions 65 that are generally horizontally aligned with the respective portions 30 and 31 of the base frame 20. Each extension 65 mounts a pivot 66 for the outer ends of hydraulic cylinder assemblies 23.

Said assemblies 23 each comprise a cylinder 67 on pivot 40 and a piston in said cylinder and having a stem 68 connected to pivot 66. It will be seen that the cylinder assemblies 23 extend angularly relative to the general disposition of the arm assemblies 22 so that extension or contraction of the stems 68 will effect pivotal movement of the arm assemblies on their pivots 55, such relative angular disposition being achieved by the rearward position of pivots 40 and the forward position of pivots 66. It will be clear without the need for detailed description that pressure fluid may be conducted to one side or the other of the pistons in cylinders 67 to contract or extend the means 23 either simultaneously or selectively to effect simultaneous or separate pivotal movement of arm assemblies 22. The full line position of the arm assemblies in Fig. 1 represents the maximum forward position thereof and, as indicated by the intermediate dot-dash line position, said arm assemblies are swingable rearwardly on pivots 55 to a maximum retraction against the sides of base frame 20.

The tension cylinder assemblies 24 are alike and, therefore, only one need be described. Fig. 6 shows the same in both elevational and sectional detail. The tension cylinder assembly that is shown comprises, generally, a housing 69, a jaw support tube assembly 70 extending horizontally through said housing, two similar oscillating cylinder assemblies 71, also extending through said housing one above and one below assembly 70, a yoke 72ª interconnecting assemblies 70 and 71, a rotation cylinder assembly 72 for rotating the tube assembly 70 and the jaw 25 thereon around the axis of assembly 70, and a pair of brackets 73, pivotally mounting housing 69 and adjustable along the arms 53 of arm assemblies 22.

Housing 69 is formed to be generally rectangular and has a central longitudinal bore 74 therethrough for the support tube assembly 70. Above and below bore 74, the housing is provided with similar bores 75 that each have end closures 76, said latter bores constituting cylinders and the closures having pressure fluid ports 77 through which fluid is conducted into said cylinder bores 75. Upwardly and downwardly projecting and aligned trunnions 78 extend from the housing 69 and have bearing in brackets 73. An angularly directed bracket extension 79 is provided on the housing and is operatively connected to the lower bracket 73.

The tube assembly 70 comprises an elongated bearing tube 80 that extends through bore 74 and is provided at one end with a clevis 81 on the cross pin 82 of which the jaw 25 is pivotally carried. The other end of tube 80 extends through and has rotational bearing in yoke 72ª and said tube is locked to move endwise therewith by means of split abutment rings 83 and 84. Bushings 85 in bore 74 guide tube 80 for both rotational and axial movement in housing 69.

Each oscillating cylinder assembly 71 includes the mentioned cylinder bore 75 and further comprises a hollow piston rod 86 that extends through said bore and through end closures 76. Between said closures, the rod is provided with a piston 87 that operates in bore 75. It will be clear that by admitting fluid pressure through one or the other port 77 to act against one side or the other of piston 87, the cylinder assemblies 71 are axially longitudinally movable relative to housing 69.

The axial movement of assemblies 71 is transmitted to tube assembly 70 by yoke 72ª. To this end, a reduced portion of each rod 86 extends through bores 88 in said yoke, and an annular shoulder 89 and a split abutment ring 90 on each rod interlocks with the yoke. In addition, each rod is held against rotation as by a key 91.

As viewed in Fig. 6, fluid admitted to the port 77 at the left of both cylinder assemblies 71 will cause movement to the right of the yoke, tube 80, and jaw 25. Fluid admitted to the ports 77 at the right will cause movement of these parts toward the left. While the system of conduits for operatively moving the jaw 25 is not shown, the same should be clear without further explanation.

As can be seen in Fig. 2, tube 80 and rods 86, on their ends opposite to yoke 72ª, may extend considerably beyond housing 69. To obviate deflection of these members, the same are interconnected by a deflection-reducing yoke 92. In this case, said yoke 92 is employed to support a graduated indicator 93 that moves with the yoke relative to edge 94 of the housing 69. Thus the amount of projection or retraction of the jaw 25, relative to housing 69, may be visually determined. Since tube 80 has limited rotation, a scale 95 is affixed to yoke 92 and an index 96 on tube 80 is associated with said scale to afford visual determination of the angle of rotation of tube 80 and, therefore, of jaw 25.

The oscillating cylinder assemblies 71 each include means for oscillating jaw 25 on its pivot 82. Said means comprises a piston 97 axially movable in a cylinder bore 98 in each rod 86, the outward movement of each said piston being limited by a gland 99. Each piston is provided with an axial cylinder bore 100 for a smaller auxiliary piston or plunger 101 that has a domed outer end and is directed to engage against a pad 102 affixed to jaw 25. Since jaw 25 has both oscillating movement on its pivot pin 82 and rotational movement around the axis of tube 80, a compensating pad or head 102ª is interposed between the domed end of each plunger 101 and respective pad 102.

Pressure fluid is admitted to cylinder bores 98 through ports 103 in both rods 86 by means of a common conduit 98a so that the pressure on both pistons 97 is the same at all times, said pressure also being manifested on the inner ends of plungers 101. However, while the unit pressure on pistons 97 and plungers 101 is the same, the total pressures, because of the differential of size, are different. Therefore, there can be no projection of plungers 101 unless pistons 97 are fully projected against glands 99. Should one end of jaw 25 meet resistance that is greater than at the other end, said jaw will seek to tilt or oscillate on its pivot 82 accordingly. One piston 97 will move inward into its bore 98 and the other plunger 101 would project outward in its bore 100 to allow jaw 25 to oscillate to a position at an angle to its normal position at right angles to tube 80. As the resistance varies during a stretch-forming operation, the above-described oscillating means will adjust itself accordingly.

The angle of tilt of jaw 25 may be visually determined by a scale 104 on the jaw and an associated index 105 extending from the clevis 81.

While the details of construction of jaw 25 are not shown, it will be understood that the same comprises an elongated member having clamp elements for tightly holding an edge portion of a sheet 26 so that the two jaws of the machine mount a sheet between them as shown in Fig. 1.

The rotation cylinder assembly 72 is best seen in Figs. 3, 6, 6ª and 6ᵇ. The same comprises a laterally extending arm 106 affixed to tube 80 between ring 84 and a thrust washer 107 interposed between said arm and the adjacent end face 108 of yoke 72ª. A cylinder 109 is pivotally carried by each hollow piston rod 86, and a piston 110ª in each cylinder 109 has a hollow piston rod 110 and an auxiliary plunger 113 is disposed in the hollow of rod 110 and is pivotally connected to arm 106. A port 111 for pressure fluid is provided for each cylinder 109 and the same are interconnected as shown at 111ª in Fig. 3 so that common pressure is conducted to said cylinders. When there are no forces tending to rotate jaw 25, both pistons 110ª will be fully projected against shoulders 112 in cylinder 109, as in Fig. 6ª. When said jaw 25 is forced by the form of die 27 to rotate in a direction to effect counterclockwise rotation of tube 80 (as viewed in Fig. 3), auxiliary plunger 113 of the lower cylinder 109 will project from hollow rod 110 so that fluid from the upper cylinder may enter said lower cylinder to fill the hollow in rod 110 exposed by projection of the plunger therein through said common connection. There will, therefore, be a comparable retraction of the piston 110ª of said upper cylinder. It will be understood that the rotation-inducing forces on jaw 25 result in compensating rotational adjustment of tube 80. Fig. 6ᵇ shows the neutral and one rotated position of jaw 25 relative to plunger 101. Of course, the reverse of the above occurs when jaw 25 is forced in a clockwise direction, the plunger 113 of the upper cylinder projecting and the piston 110ª of the lower cylinder retracting.

Each bracket 73 comprises a body 114 slidably engaged with the arms 53, a key 115 arranged transversely of said body to lock the same in selected and aligned key slots 58 and 59, and spring-urged linkage 116 normally holding said key in its slot. A manual lever 117 is provided to selectively lock the key in place as shown, or, operate said linkage to retract the key so that brackets 73 may be moved along arms 53 to desired position.

The tension cylinder assemblies 24 are pivotally mounted on their trunnions 78. Such pivotal movement is effected by a cylinder-piston unit 118 extending between lower bracket 73 and the mentioned extension 79 of housing 69. By supplying fluid pressure to unit 118 in the usual manner, each assembly 24 can be swung on trunnions 78. The dot-dash line position of assemblies 24 in Fig. 1 shows such tilting relative to brackets 73 and arms 53.

The die 27 may have different forms according to the finished shape into which a sheet 26 is to be stretch-formed. The die that is shown is tapered so that its upper portion is smaller than the lower portion. It will be evident that jaws 25 will both rotate on pins 82 and oscillate with tubes 80, as the arm assemblies are swung rearwardly by contraction of cylinder assemblies 23, as the sheet stretches over the die. Since the swinging movement of the arm assemblies is coupled with simultaneous retraction of the tension means of the tension cylinder assemblies 24, the sheet is stretched in the process of forming so as to tightly engage the die face and be formed therearound. It will be clear that first the vertical center of the die is engaged by the sheet and then successively more lateral portions are so engaged until the sheet is completely formed. The arm assemblies can be moved to bring the ends of the sheet into parallelism or the same may be stopped at any intermediate point, as desired. Also, only one arm assembly may be swung or said assemblies swung through arcs of different length, as desired.

The modification shown in Figs. 9 to 16, inclusive, comprises, generally, a base frame 150, a pair of arms 151 pivotally carried on said frame, an actuating cylinder assembly 152 disposed with the base frame, a cross-head 153 movable along the base frame by the cylinder assembly 152, actuating links 154 connecting the arms 151 and the cross-head, a tension cylinder assembly 155 carried by each arm, and means 156 for effecting traverse of said assemblies 155 to a desired location along each respective arm 151.

The base frame 150 comprises a fabricated structure having a forward frame part 157 that is provided with a table top 158 in which are formed a plurality of key grooves 159a. The top 158 is wider than frame part 157 and, as best seen in Fig. 12, the latter is provided with bearing brackets 159 for pivot pins 160 on which arms 151 are pivotally carried. Frame part 157 is provided with a front wall 161 that encloses brackets 159 from the front and also forms part of the support for said brackets. Table top 158 serves to support a die 162, the same being located as by a key 163 in one of the grooves 159a and, of course, is secured in place in a conventional manner.

The base frame is provided with a rearwardly extending frame part 164 that is a lower extension of frame part 157, the same including a slideway 165 along which cross-head 153 moves.

The arms 151 are alike and are arranged on their pivots 160 to extend laterally from opposite sides of frame part 157, said arms being swingable on their pivots to a rear position parallel to frame part 164 and to each other. Each arm 151 is provided with a top plate 166 that has transverse key grooves 167. As best seen in Fig. 13, in order that the arms may achieve the mentioned position parallel to frame part 164, each arm is provided with a through opening 168 so that the actuating links 154 may pass therethrough and connect to pivots 169 forward of the front faces 170 of the arms. A housing groove 171 is provided in the rear face of each arm 151 to accommodate links 154 when the dot-dash line position of Fig. 13 is achieved.

The actuating cylinder assembly 152 extends from frame wall 161 rearward toward, but short of, slideway 165. The same comprises a cylinder 172 in which operates a piston 173, the latter having a stem 174 that extends rearwardly through the end 175 of the cylinder and connects by a pin 176 to cross-head 153. Pressure fluid is admitted into cylinder 172 at 177 to urge piston 173 and the cross-head rearward. Reverse movement is had by admitting pressure into the opposite end of the cylinder at 178.

The cross-head 153, as explained, is mounted to slide along slideway 165 under control of the actuating cylinder assembly 152. The rear ends of links 154 are connected by pins 179 to said cross-head 153 and it will be clear that rearward movement of the cross-head results in a pull on said links and forward movement results in the links being pushed. Such movement of the cross-head and links causes respective rearward and forward swing of arms 151.

The tension cylinder assemblies 155 are alike but opposite and are shown in detail in Figs. 14 and 15. Each assembly 155 comprises, generally, a bracket 180 mounted for adjustment along each respective arm 151 on the top plate 166 thereof, a key 181 serving to lock said bracket in a selected key slot 167, a cylinder 182 having vertically disposed trunnions 183 engaged with the bracket so that said cylinder is mounted to swing in a horizontal plane, a piston 184 in said cylinder and having a stem 185 that extends outwardly of the cylinder in a direction toward the front of die 162 on table 158, a jaw or chuck 186 on the projecting end of each stem, and anti-rotation means 187 interconnecting the stem and cylinder to allow the former to move axially but not rotationally.

Bracket 180 has a generally C-shaped form affording upper and lower bearings 188 into which trunnions 183 extend. The key 181, that locks the bracket to its arm, may be withdrawn endwise when adjustment of the bracket is desired, as shown in Fig. 16.

Cylinder 182 is of sturdy construction to withstand high fluid pressures, the same comprising a cylinder tube 189, one end closure 190, a second end closure 191 through which stem 185 extends, an intermediate ring 192 around tube 189, and two sets of tension rods 193 and 194, interconnecting the respective end closures 190 and 191 with said ring. The trunnions 183 are carried by said intermediate ring 192. It will be understood that suitable conduits for pressure fluid are provided at the ends of the cylinder for effecting axial projection or retraction of stem 185, as desired.

Jaw or chuck 186 comprises a cylindrical member designed to receive and grip the end of an elongated work-piece 195 and it will be understood that the gripping portions of said jaws are especially formed according to the cross-sectional form of said work-piece. An angle-sectioned work-piece 195 is shown, but the same may have various shapes, as can be understood.

The means 187 is provided to obviate undesired rotation of the jaws or chucks, said means comprising two links 196 and 197 that are connected by a hinge 198. Link 196 is hingedly connected at 199 to cylinder closure 191, and link 197, by a hinge 200, to a clamp ring 201 on stem 185 adjacent jaw 186.

The above-described tension cylinder assemblies 155 swing bodily with the respective arms 151 on which they are mounted. The cylinders 182 are free on their trunnions 183 and can assume an angular position relative to said arms as the arms are swung rearward in the process of bending a work-piece 195 around die 162, as shown in the two operative positions of Fig. 9. While in most instances, stretch is imparted to the work-piece by simultaneous retraction of jaws 186, one may be retracted more than the other, or one may be held stationary while the other is retracted, as desired.

The means 156 is provided to obviate manual handling of each tension cylinder assembly which, in the larger machines, is quite heavy. Said means comprises an electric motor 202 that drives a lead screw 203 at a low speed due to a reduction gear unit 204 interposed between the same and the motor. Said lead screw extends along the front of each arm 151 between brackets 205 and 206 and passes through a bracket 207 depending from bracket 180. Bracket 207 is a box-like structure that houses a nut 208 threadedly engaged with the lead screw and limits the endwise movement of said nut relative to bracket 180.

Nut 208 is of a length to have end play or movement between opposed walls 209 of bracket 207. Consequently, a small amount of movement of said nut relative to bracket 180 is had before the same achieves abutment with one wall 209 or the other to effect movement of bracket 180 along its arm. Thus, torque is reduced on the motor 202 and accurate alignment of a stop 210 carried by the nut is possible so that a notch 211 in said stop can be aligned with key 181 to facilitate endwise intrusion or extraction of the latter.

While the invention that has been illustrated and described is now regarded as the preferred embodiments, the constructions are, of course, subject to modifications without departing from the spirit and scope of the invention. It is therefore not desired to restrict the invention to the particular forms of construction illustrated and described, but to cover all modifications that may fall within the scope of the appended claims.

Having thus described the invention, what is claimed and desired to be secured by Letters Patent is:

1. In a stretch-forming machine, a pivoted housing, a tube extending through the housing and transverse to the pivots, a pivoted work-piece-gripping jaw on one end of the tube, a yoke on the other end of said tube, and pressure-fluid-operated cylinder means carried by the housing parallel to said tube and having end engagement with the jaw on either side of each pivot, said cylinder means being connected to the yoke and movable endwise to move said yoke and tube endwise.

2. In a stretch-forming machine, a pivoted housing, a tube extending through the housing and transverse to the pivots, a pivoted work-piece-gripping jaw on one end of the tube, a yoke on the other end of said tube, pressure-fluid-operated cylinder means carried by the housing parallel to said tube and having end engagement with the jaw on either side of each pivot, said cylinder means being connected to the yoke and movable endwise to move said yoke and tube endwise, an arm on the end of said tube beyond the yoke, a pair of opposed piston-cylinder units extending between said arm and said cylinder means, and an hydraulic interconnection between the cylinders of said units to provide similar hydraulic pressures in said cylinders to stabilize the rotational position of the jaw-carrying tube during application of forces on the jaw that oscillate the same around the axis of the tube.

3. In a stretch-forming machine, a work-piece-gripping jaw, a housing, a member movable in said housing, a pivot connecting the jaw and said member, and a pair of interconnected fluid-pressure-operated cylinder-piston units engaged with the jaw, one on each side of said member and pivot and responsive to tilt of the jaw on its pivot to stabilize the position of the jaw when, during movement of the jaw and said member relative to the housing, one end of the jaw encounters greater resistance to movement than the other end.

4. In a stretch-forming machine, a work-piece, gripping jaw, a housing, a member movable in said housing, a pivot connecting the jaw and said member, a pair of interconnected fluid-pressure-operated cylinder-piston units engaged with the jaw, one on each side of said member and pivot and responsive to tilt of the jaw on its pivot to stabilize the position of the jaw when, during movement of the jaw and said member relative to the housing, one end of the jaw encounters greater resistance to movement than the other end, each piston-cylinder unit including an extensible and contractible pressure-fluid-operated plunger engaged with the jaw.

5. In a stretch-forming machine, a work-piece-gripping jaw, a housing, a member movable in said housing, a pivot connecting the jaw and said member, a pair of interconnected fluid-pressure-operated cylinder-piston units engaged with the jaw, one on each side of said member and pivot and responsive to tilt of the jaw on its pivot to stabilize the position of the jaw when, during movement of the jaw and said member relative to the housing, one end of the jaw encounters greater resistance to movement than the other end, and pressure-fluid-operated means interconnecting the cylinder-piston units and said member to oscillate said member and the jaw in a plane transverse to the tilt thereof.

6. A tension device for a stretch-forming machine comprising: a housing, a cylindrical member extending through and beyond both sides of the housing, a transverse pivot on one end of said cylindrical member, an elongated work-piece-engaging jaw carried by said pivot, a pair of main cylinders in said housing one on each side of the cylindrical member and parallel thereto, a main piston in each cylinder and each having a main hollow piston rod extending through and beyond both sides of the housing, the end of each main hollow piston rod adjacent the jaw having an auxiliary cylinder bore therein, an auxiliary hollow piston within each said bore, a plunger in the hollow of each auxiliary piston and directed to engage the jaw one on each side of the pivot thereof, and a pressure-fluid conduit interconnecting the hollows of the main piston rods to transfer pressure fluid from one main hollow piston rod to the other when the jaw is moved on its pivot in a direction to retract the plunger and auxiliary piston of said one main piston rod, the transferred fluid in the other main piston rod simultaneously projecting the plunger of said other main piston rod to retain engagement with the jaw when moved.

7. A tension device for a stretch-forming machine comprising: a housing, a cylindrical member extending through and beyond both sides of the housing, a transverse pivot on one end of said cylindrical member, an elongated work-piece-engaging jaw carried by said pivot, a pair of main cylinders in said housing one on each side of the cylindrical member and parallel thereto, a main piston in each cylinder and each having a main hollow piston rod extending through and beyond both sides of the housing, a yoke connecting said cylindrical member and the two hollow piston rods to move together under force of pressure fluid admitted into the main cylinders and acting on the main pistons therein, the end of each main hollow piston rod adjacent the jaw having an auxiliary cylinder bore therein, an auxiliary hollow piston within each said bore, a plunger in the hollow of each auxiliary piston and directed to engage the jaw one on each side of the pivot thereof, and a pressure-fluid conduit inter-connecting the hollows of the main piston rods to transfer pressure fluid from one main hollow piston rod to the other when the jaw is moved on its pivot in a direction to retract the plunger and auxiliary piston of said one main piston rod, the transferred fluid in the other main piston rod simultaneously projecting the plunger of said other main piston rod to retain engagement with the jaw when moved.

8. A tension device for a stretch-forming machine comprising: a housing, a cylindrical member extending through and beyond both sides of the housing, a transverse pivot on one end of said cylindrical member, an elongated work-piece-engaging jaw carried by said pivot, a pair of main cylinders in said housing one on each side of the cylindrical member and parallel thereto, a main piston in each cylinder and each having a main hollow piston rod extending through and beyond both sides of the housing, a yoke connecting said cylindrical member and the two hollow piston rods to move together under force of pressure fluid admitted into the main cylinders and acting on the main pistons therein, a laterally extending arm affixed to the cylindrical member adjacent said yoke, an auxiliary cylinder pivotally connected to each hollow piston rod, a hollow auxiliary piston having an elongated hollow stem operatively projecting from each auxiliary cylinder and limited for movement by a shoulder in each said auxiliary cylinder, a plunger in the hollow of each said stem and each pivotally connected to the mentioned arm on opposite sides thereof, and a pressure-fluid conduit interconnecting said auxiliary cylinders to transfer pressure fluid from one to the other when the jaw is rotated on the axis of the cylindrical member to similarly rotate the arm to, thereby, retract one hollow stem into its cylinder, the plunger in the other stem simultaneously projecting under force of fluid transferred from the first named auxiliary cylinder.

LANDON R. GRAY.
HARRY P. SMITH, Jr.

REFERENCES CITED

The following references are of record in the file of this patent:

UNITED STATES PATENTS

| Number | Name | Date |
|---|---|---|
| 895,438 | Delany | Aug. 11, 1908 |
| 1,927,580 | Wisner | Sept. 19, 1933 |
| 1,934,411 | Dahlman | Nov. 7, 1933 |
| 2,084,368 | Wynn | June 22, 1937 |
| 2,346,213 | Flowers | Apr. 11, 1944 |
| 2,357,027 | Seifried | Aug. 29, 1944 |
| 2,365,773 | Osgood | Dec. 26, 1944 |
| 2,437,092 | Greene | Mar. 2, 1948 |
| 2,437,105 | Lindsey | Mar. 2, 1948 |
| 2,442,268 | Fields | May 25, 1948 |
| 2,487,972 | Katz | Nov. 15, 1949 |
| 2,515,734 | Rathgen | July 18, 1950 |
| 2,515,752 | Weightman | July 18, 1950 |
| 2,527,412 | Green | Oct. 24, 1950 |
| 2,545,921 | Goodwillie | Mar. 20, 1951 |

OTHER REFERENCES

P. 102 of Sept. 20, 1948, issue of Steel Mag.